United States Patent [19]

Khammous et al.

[11] 3,849,757

[45] Nov. 19, 1974

[54] TANTALUM RESISTORS WITH GOLD CONTACTS

[75] Inventors: Robert Khammous, Chickli-Pariente; André Langlet, Paris; Michel Leclercq, Levallois-Perret, all of France

[73] Assignee: Compagnie Honeywell Bull (Societe Anonyme), Paris, France

[22] Filed: Dec. 6, 1973

[21] Appl. No.: 422,463

[30] Foreign Application Priority Data

Dec. 14, 1972 France .............................. 72.44558

[52] U.S. Cl. ............. 338/320, 317/101 A, 338/309, 338/327, 338/328, 338/226, 174/DIG. 5

[51] Int. Cl. ............................................... H01c 1/16

[58] Field of Search ........... 338/308, 309, 327, 328, 338/320; 317/101 A

[56] References Cited

UNITED STATES PATENTS

| | | | |
|---|---|---|---|
| 3,296,574 | 1/1967 | Tassara | 338/327 |
| 3,456,159 | 7/1969 | Davis | 317/101 A |
| 3,649,945 | 3/1972 | Waits | 338/328 |

*Primary Examiner*—E. A. Goldberg
*Attorney, Agent, or Firm*—Ronald T. Reiling

[57] ABSTRACT

A tantalum resistor on a substrate has contacts formed of gold domes. Between the domes and the resistor are layers of metal of gold and molybdenum.

12 Claims, 14 Drawing Figures

TANTALUM RESISTORS WITH GOLD CONTACTS

SUMMARY OF THE INVENTION

The present invention concerns an electrical device comprising a substrate bearing resistive elements deposited in thin films. It also concerns the fabrication process for such a device.

This invention relates more particularly to microelectronics and is intended to furnish electrical devices compatible with integrated circuits.

In this field, electrical devices are already known in which resistive elements are formed by diffused zones in a semiconductor substrate. The known devices exhibit many disadvantages. In fact, not only are their resistive elements unable to provide resistances of precise value, but it is also difficult to give these resistive elements widely different values of resistance.

To avoid these disadvantages, the fabrication of thin-film electrical devices has been considered previously. However, the known devices comprise flat aluminum contacts which make it very difficult to automate their setting in place and their attachment in other circuits.

The present invention remedies all these disadvantages. In particular, it permits automation of the handling and attachment of electrical devices, not only because it provides devices that can be made similar to ordinary integrated circuits with regard to size and weight, for which there already exist automatic handling chains, but also because the electrical devices that are obtained comprise projecting contacts which permit automatic soldering to other contacts.

According to the invention, the electrical device comprising at least one resistive element formed by a thin metal strip borne by a rigid substrate and contact means for said resistive element is remarkable in that said resistive element is formed of a tantalum strip, whereas said contact means are formed of a superposition of at least one layer of molybdenum and gold and that at least one gold dome is disposed on each of them.

Thus, the molybdenum layer ensures good adhesion between the tantalum strip and the gold layer, the adhesion between the latter and the gold dome naturally being escellent.

Preferably, the tantalum strip has a thickness between 500 and 1,000 A, while the molybdenum layer and the gold layer can have thicknesses of about 1,500 and 10,000 A, respectively. As for the gold dome, it can have a height of about ten microns.

When it is desired to protect the device by an exterior cover layer, e.g., of glass, the covering not including said domes, then it is advantageous to provide a second layer of molybdenum on said layer of gold, in order to ensure good adhesion to said cover layer. This second layer of molybdenum can likewise exhibit a thickness on the order of 1,500 A. Another layer of gold can then be provided between this second layer of molybdenum and the domes.

The substrate should be electrically insulating. It could be made with a glass or alumina base. However, in view of the compatibility with integrated circuits used conjointly with the electrical device and also in view of the dissipation of the heat released by the resistive elements, it is advantageous to use a silicon substrate. This substrate obviously should be covered by a layer of electrically insulating silica in order to prevent electrical leaks.

In one advantageous embodiment, the device according to the invention comprises a plurality of divider bridges, e.g., 12, mounted in parallel, each consisting of two resistances in series and intended for impedance matching of interconnection lines of fast integrated circuits connected directly to the substrates with high density of interconnection. Preferably, each bridge is arranged so that one of its ends is connected to a common central contact unit and its other end is connected to a common contact forming a peripheral line surrounding the totality of said bridges, while the points common to both resistances of a bridge are each formed by a contact unit. Preferably, all the tantalum strips forming the bridge resistances are parallel to each other, with certain of said resistances being able to comprise several parallel portions joined by transverse portions to form U's or frets.

The devices according to the invention can be fabricated by the implementation of known techniques.

To form the various conducting or insulating zones, it is preferable to deposit continuous layers which are then cut to the desired contours by photoengraving, rather than attempting to deposit said zones directly in the desired shapes, e.g., by evaporation through a mask. The gold domes are formed advantageously by selective electrolysis. However, these gold domes could be fabricated by photoengraving a continuous layer deposited by electrolysis.

Preferably, the various metallic or insulating layers are deposited by high-frequency cathode sputtering. However, the deposit could also be obtained by electron-gun evaporation.

The layers of molybdenum are engraved by a solution of ferric chloride, while those of gold are engraved by a solution of iodine and potassium iodide, and the layer of tantalum is cut by immersion in a potash solution. The layers of silica and glass can be engraved in a solution of hydrofluoric acid and ammonium fluoride.

DESCRIPTION OF THE DRAWINGS

The Figures of the appended drawing make evident how the invention can be implemented.

Figures 1, 2, 3, 4, 5, 6, 7, 8, 9:
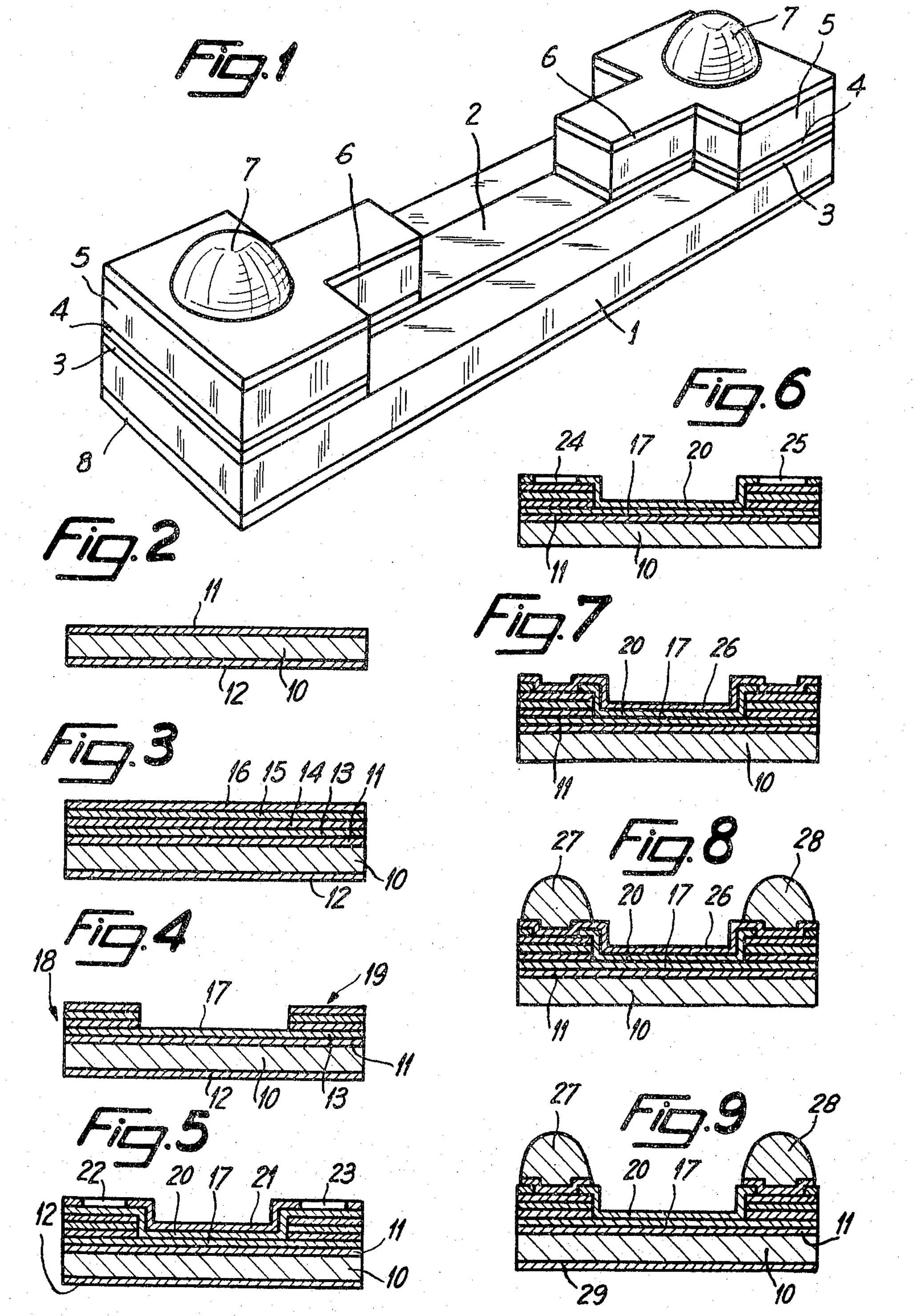
FIG. 1 shows in perspective an electrical device with resistive element according to the invention.
FIGS. 2 to 9 illustrate schematically the fabrication process according to the invention for the device with resistive element of FIG. 1.

The electrical device according to the invention, shown in FIG. 1, is particularly simple and is intended to make the invention well understandable. It comprises a silicon substrate 1 covered by a layer of insulating silica (not illustrated). The resistive element is formed by a tantalum strip 2 united at its two ends with broadened zones of tantalum 3. On the tantalum zones 3 are arranged molybdenum zones 4 on which rest thick zones 5 of gold. Molybdenum zones 6 are possibly arranged on the gold zones 5, while the gold domes 7 are borne by said zones 6. Obviously, the various zones 3, 4, 5, 6 of one end of the strip 2 and the corresponding dome 7 are in close electrical contact. Thus, the contact means of the resistive element 2 are formed by the two units 3, 4, 5, 6 and the corresponding dome 7. A layer of gold 8, in one piece with the face of the substrate 1 opposite the resistive element 2, makes it possible to attach the device to an interconnection substrate while allowing good evacuation of the heat generated by said element.

A protective cover layer has not been illustrated in FIG. 1.

FIGS. 2 to 9 illustrate schematically the main steps in the process for fabricating a device with resistive element similar to that of FIG. 1.

To fabricate such a device, a silicon substrate 10 is oxidized thermally so that its main faces are covered with layers of silica 11 and 12 (FIG. 2). On the silica layer 11, a layer 13 of tantalum about 1,000. A thick is deposited (see FIG. 3) over the entire corresponding surface area of the substrate 10. Then a 1,500 A thick layer 14 of molybdenum is deposited on the layer 13. Then a 10,000 A thick layer of gold 15 is deposited on the layer 14. Finally, a 1,500 A thick layer 16 of molybdenum is deposited on the latter. The various layers are deposited by high-frequency cathode sputtering.

In order to form the strip 17 of the device in the tantalum layer 13, the portions of layers 14, 15 and 16 arranged above said stip 17 and the portions of layer 13 exterior to said stip 17 are eliminated, while contriving contact units 18 and 19 at each end of the strip (see FIG. 4). Thus, each of these units is formed by the superposition of zones of various metal layers 13 to 16.

On the units 18 and 19, on the strip 17 and on the exposed portions of the layer 11, one then deposits (see FIG. 5) a layer of glass 20 intended to form a protective cover whose thickness is about 10,000 A. In order to permit the engraving of contact openings in this glass layer 20, one deposits on it a layer of molybdenum 21 (5,000 A thick) intended to serve as a mask for the engraving of the layer 20. In fact, since the latter is very difficult to engrave, known photosensitive lacquers (photoresist) would not be resistant enough to allow the opening of windows in said layer 20 by engraving.

For that purpose, using the ordinary means of photoengraving, openings 22 and 23 are opened in the molybdenum layer 21 at the locations desired for the contact openings, i.e., on the units 18 and 19. Then the glass layer 20 is attacked chemically through the openings 22 and 23 so as to form contact openings 24 and 25, after which the molybdenum layer 21 is eliminated (see FIG. 6). It should be noted that, during the attack of the layer 20, the silica layer 12 which is not protected is itself also attacked and disappears.

On the layer 20 thus re-exposed and in the openings 24 and 25, a layer of gold 26 about 2,000 A thick is then deposited (see FIG. 7). Then, by selective electrolysis, gold domes 27 and 28 about 10 u high are made to grow straight up from the openings 24 and 25 (see FIG. 8).

Then, the portions of the gold layer 26 exterior to the domes 27 and 28 are eliminated and the uncovered face of the substrate 10 is covered with a layer of gold 29 intended for attachment of the device (see FIG. 9). A layer of molybdenum or NiCr can possibly be interposed between said face of the substrate and the layer 29.

The example just described is purposely simplified. It is quite evident that, as is known in the techniques of integrated circuits, a plurality of identical electrical devices can be fabricated simultaneously. For that purpose, one can start with a base disk or platelet 30 (see FIG. 10), often called a wafer, which is divided into a multitude of zones 31 separated from one another by checkered grooves 32. These grooves are obtained by a photoresist operation which, effected prior to that treatment of the various zones 31, makes it possible to eliminate simultaneously the silica layer 12. The various zones 31 undergo simutaneously the same treatments and, at the end of the process, they all comprise the same electrical device. Then they are separated from one another and they become independent devices (chips). Zones 33 can be provided to check the various operations of the process.

Figure 11:
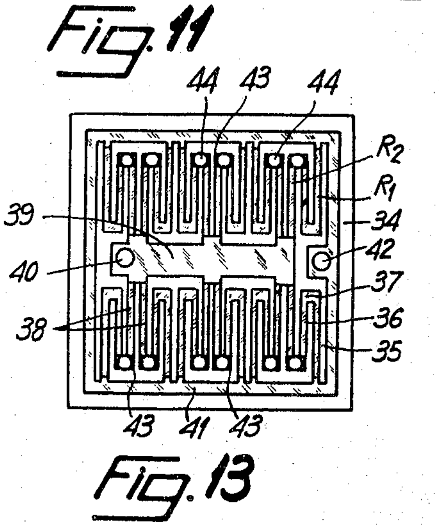
FIG. 11 shows a variant embodiment of the device according to the invention.

Likewise, the electrical devices themselves can be more complicated than those shown in FIG. 1. FIG. 11 shows an example of a complex electrical device. This device comprises a substrate 34 (which can be a region 31 of the disk 30) on which are mounted twelve divider bridges each comprising two resistances $R_1$ and $R_2$ in series, formed by tantalum strips. The tantalum layer in which they are formed can have a resistance of 50 Ω per square, while their width can be near 50 > and their length is chosen so that the resistances $R_1$ and $R_2$ have respective values of 1,500 Ω and 620 Ω, for example.

The resistances $R_1$ are formed by two portions of parallel bands 35 and 36, connected to each other by a transverse portion 37 (a resistance $R_1$ thus has the shape of a U), while the resistances $R_2$ are formed by a single strip 38. The portions 35, 36 and 38 are parallel to each other. The device comprises an elongated central contact unit 39 (corresponding to the unit 18, for example) to which the various resistances $R_2$ are connected by one of their ends. The central unit 39 bears a dome 40 (corresponding to the dome 27) via which it can be connected, for example, to the positive terminal of a dc source. Six bridges $R_1$, $R_2$ are arranged on one side of the unit 39 and six others on the other side.

The device comprises another peripheral contact 41 (corresponding to the unit 19, for example) forming a continuous contour surrounding the 12 bridges. This peripheral contact 41 bears a dome 42 (corresponding to the dome 28) via which it can be connected to the negative terminal of said voltage source. One end of the various resistances $R_1$ is connected to said contact 41.

Finally, each resistance $R_1$ is connected to a resistance $R_2$ to form a divider bridge. The ends of these resistances, opposite the contacts 39 and 41 respectively, are joined by units 43 (with structure analogous to the units 18 and 19) bearing domes 44 (similar to the domes 27 or 28). Via the domes 44, the common points of the various couples $R_1$, $R_2$ can be connected to the transmission lines of substrates with high density of interconnection, in order to prevent reflections in these lines and to match the various impedances.

Figure 10:
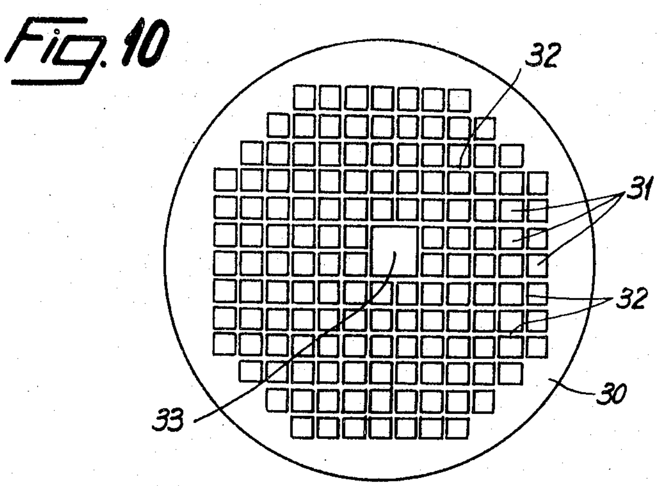
FIG. 10 shows a disk (wafer) on which can be formed a plurality of resistive elements according to the invention.

We shall now describe in detail the various steps for fabricating a plurality of such electrical devices in the silicon disk 30 of FIG. 10.

The disk 30 (which does not yet comprise the separation grooves 32) is oxidized thermally so that its plane faces are covered by layers of silica whose thickness can be between 5,000 and 12,000 A. The silica layers are cleaned, for example, by immersion in acetone, isopropyl alcohol and trichloroethylene. Then the disk is dried in vapor phase and placed in a drying stove at 160°c for 30 minutes.

The disk is then ready for the metal deposits. The tantalum layer is deposited by HF cathode sputtering onto the totality of one of the surfaces of the disk 30, then the molybdenum layer on it, then the gold layer and finally the second layer of molybdenum.

The metal layers are cleaned by immersion in trichloroethylene, then in acetone. A photosensitive lacquer (for example, that known commercially by the name K.A.R. 03) is spread onto the second layer of molybdenum and it is dried in the stove. This layer is exposed through a first mask so as to bring out the grid of lines 32, then developed. The disk 30 is then immersed in a solution of ferric chloride which eliminates the second layer of molybdenum above the lines 32, then in a solution of iodine and potassium iodide which eliminates the layer of gold at the same locations and finally again in a solution of ferric chloride to engrave the first layer of molybdenum. Then the photosensitive lacquer is eliminated and, after rinsing, the disk 30 is immersed in a solution of potash in order to engrave the layer of tantalum along the lines 32. After that, the layer of silica is engraved along the same lines 32 by immersion in a solution of hydrofluoric acid and ammonium fluoride. At the same time, the layer of silica 12 is eliminated.

The face of disk 30 is then formed of a multitude of zones 31 (covered by the metal layers described previously), separated by lines of separation 32. The state of their engraving is then inspected optically.

Figure 12:
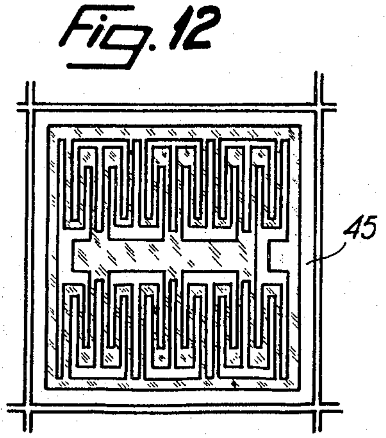
FIGS. 12, 13 and 14 show the unit pattern of masks used to fabricate the device of FIG. 11.

After cleaning, a layer of photosensitive lacquer is spread as before and it is exposed through a mask of which a pattern 45, corresponding to a zone 31, is shown in FIG. 12. The engraving of the layers of molybdenum and gold and the elimination of the photosensitive lacquer are effected as before. The same holds for the engraving of the tantalum layer. Finally, another optical check enables the condition of disk 30 to be inspected.

Figure 13:
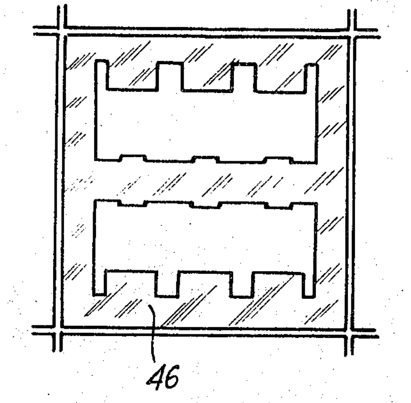

In order to release the resistive strips forming the resistances, the disk is cleaned, the phtotosensitive lacquer is spread as before and the exposure is made through a mask of which a pattern 46, corresponding to a zone 31, is shown in FIG. 13. Here again, the engraving of the layers of molybdenum and gold and the elimination of the photosensitive lacquer are effected as before. An optical check is made and then an electrical check in test zone 33, which is a resistance in the shape of a square.

Then the disk is subjected to a thermal passivation by passing it into a stove, whereupon another electrical check is performed.

Figure 14:
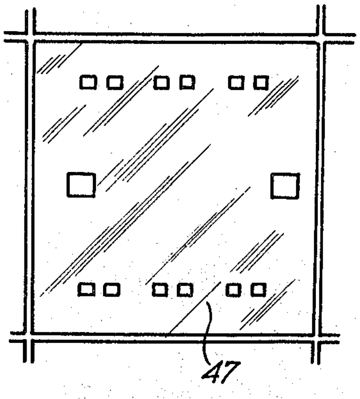

Then it is advisable to deposit the protective cover layer. To do that, after cleaning and rinsing the disk, it is heated to 200°C under vacuum. A layer of glass (for example, that known commercially by the name E.E. 9) and then a layer of molybdenum are then deposited by high-frequency cathode sputtering. The latter (layer of molybdenum) is cleaned and covered by a layer of photosensitive lacquer which is exposed through a mask of which a pattern 47, corresponding to a zone 31, is shown in FIG. 14. This mask will permit openings to be cut for the domes 40, 42 and 44. The photosensitive layer is developed and then one proceeds, as before, with the chemical etching of the layer of molybdenum before eliminating said lacquer. Then the layer of glass is engraved, making use of the molybdenum mask, by means of a mixture of hydrofluoric acid and ammonium fluoride, after which the layer of molybdenum is eliminated and an optical check is performed.

After cleaning, the disk is then ready to receive a continuous layer of gold by high-frequency cathode sputtering. Then, after another cleaning, it is ready for the formation of the domes 40, 42 and 44. For that purpose, one spreads a layer of photosensitive lacquer which is exposed through a mask similar to that shown in FIG. 14, after which it is developed. Then a pregilding is effected by selective electrolytic deposition. To do that, the disk is immersed for 1 minute at 30°C in an electrolytic solution having the following composition:

| | |
|---|---|
| Au, $K(CN)_2$ | 3 g |
| disodium citrate | 60 g |
| citric acid | 30 g |

with the current density being 1 A/dm$^2$.

The disk is then rinsed and one proceeds with the selective electrolytic deposition of gold in the electrolyte known commercially by the name Technigold 25, at 50°C with a current density of 0.3 A/dm$^2$.

Finally, the layer of photosensitive lacquer is eliminated, the layer of gold is engraved by immersion in a solution of the commercial product Aurostrip Au 78 at 40°C and then the disk is inspected optically after rinsing and drying.

After that, one proceeds with the metallization of the interior face of the disk. Then it is cut, e.g., by grinding, along the grooves 32.

What is claimed is:

1. An electrical device comprising a resistive element formed by a thin metal strip borne by a rigid, electrically insulating substrate, and a plurality of contact means for said resistive element, said resistive element formed of a tantalum strip and a superposition of a layer of molybdenum and a layer of gold, with a gold dome disposed on each of said contact means.

2. An electrical device according to claim 1, further comprising an exterior protective cover layer and a second layer of molybdenum interposed between said cover layer and said gold layer.

3. An electrical device according to claim 2, in which said cover layer consists of glass.

4. An electrical device according to claim 3, further comprising a second gold layer between said second molybdenum layer and said cover layer.

5. An electrical device according to claim 1 in which said substrat is made of silicon covered by a layer of silica.

6. An electrical device according to claim 1 in which the thickness of said tantalum strip is between 500 and 1,000 A.

7. An electrical device according to claim 1 in which the thickness of said molybdenum layer is approximately 1,500 A.

8. An electrical device according to claim 1 in which the thickness of said gold layer is approximately 10,000 A.

9. An electrical device according to claim 1 in which the height of said gold domes is approximately 10 microns.

10. An electrical device according to claim 1 further comprising a gold interconnection layer superposed upon the bottom face of said substrate.

11. An electrical device comprising:

a resistive element formed by a tantalum strip of between 500 and 1,000 A in thickness, borne by a rigid substrate formed by silicon covered by a layer of silica and superposed with a gold interconnection layer upon the bottom face thereof, said resistive element superposed with a first molybdenum layer of approximately 1,500 A in thickness, a first gold layer of approximately 10,000 A in thickness, a second molybdenum layer, a second gold layer, and an exterior protective cover layer of glass enclosing said resistive element; and a plurality of contact means for said resistive element, each comprising a gold dome of approximately 10 microns in height.

12. An electrical system comprising a plurality of subsystems, each subsystem comprising two end-to-end electrical devices according to claim 1, and arranged so that one end of each subsystem is connected to a common central contact, the other end of each subsystem is connected to a common contact forming a peripheral line surrounding the totality of subsystems, and points common to two resistive elements of a subsystem each comprise a subsystem contact, with the central contact, peripheral contact, and each subsystem contact being provided with a gold dome.

* * * * *